A. WORK.
Swivel-Joint.
No. 203,307.           Patented May 7, 1878.
Fig. 1.            Fig. 2.
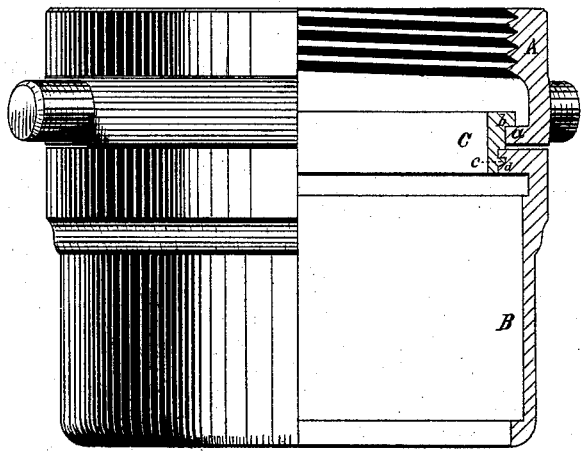
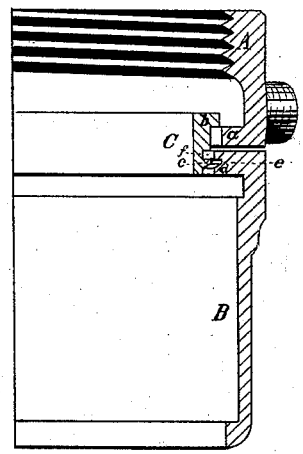
Fig. 3.
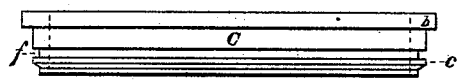
WITNESSES.            INVENTOR.
H. W. Hubbard,        Alanson Work
Saml. J. Colwell

UNITED STATES PATENT OFFICE.

ALANSON WORK, OF PROVIDENCE, RHODE ISLAND.

IMPROVEMENT IN SWIVEL-JOINTS.

Specification forming part of Letters Patent No. 203,307, dated May 7, 1878; application filed October 27, 1877.

*To all whom it may concern:*

Be it known that I, ALANSON WORK, of the city of Providence, in the county of Providence and State of Rhode Island, have invented a new and useful Improvement in Swivel-Joints; and I do hereby declare that the following is a full, clear, and exact description of the construction and operation of the same, reference being had to the annexed drawings, making a part of this specification, and to the letters and figures of reference marked thereon.

Figures 1 and 2 of the drawings represent longitudinal sections of a hose-coupling, and Fig. 3 is a side elevation of the independent ring.

The nature of my invention consists in a rapid and effective method of forming a swivel-joint.

In the following description and accompanying drawing it is shown as more particularly applied to a hose-coupling; but I do not limit myself to that application of it.

In the drawings, A represents the female screw of a hose-coupling, provided with the annular shoulder $a$. This is secured to the band B by a swivel-joint.

C is a ring, of brass or other suitable ductile metal, so constructed as to form on its outer circumference the shoulder $b$ and the tongue $c$.

The band B is formed with an inner circumferential shoulder, $d$, in which is cut the annular groove $e$. The outer diameters of the shoulder $b$ and tongue $c$ on the ring are a trifle less than the inner diameters, respectively, of the shoulder $a$ of the female screw and the shoulder $d$ of the band.

The operation of forming the swivel-joint is as follows: The screw A, band B, and ring C are placed together in the position shown in Fig. 2. Then, by means of a suitable expanding-tool, the ring C is expanded radially, forcing tongue $c$ into the groove $e$, so as to make a perfectly water-tight joint, and interlocking the shoulders $b$ and $a$, leaving it, when completed, as shown in Fig. 1.

I use for this purpose the expanding-tool, patented by me October 10, 1876; but the same result may be accomplished by using almost any of the well-known forms of boiler-tube expanders.

The ring C is also provided with the groove $f$, the object of which is to support that portion of the shoulder $d$ above the groove, to prevent it from spreading so as to bind the swivel as the wedge-shaped tongue enters the groove $e$.

The ordinary method of forming such joints in a hose-coupling is by threading the outer surface of the ring and the inner surface of the shoulder of the band. The two are then screwed together and soldered. Such a method is not only more expensive than the one herein described, but the joint so made frequently fails to be water-tight, on account of defective soldering. The heat applied during the process of soldering also discolors the bright surface of the metal, which, from its construction, is more conveniently finished and polished before the union is made.

What I claim as new, and desire to secure by Letters Patent, is—

1. The method herein described of attaching a swivel by expanding the independent ring C into interlocking position with the swivel and with the band B, or other base, substantially as and for the purposes herein set forth.

2. The combination of the swivel A provided with shoulder $a$, band B with grooved shoulder $d$, and ring C with the shoulder $b$ and tongue $c$, as herein set forth.

In testimony that I claim the above I have hereunto subscribed my name in the presence of two witnesses.

ALANSON WORK.

Witnesses:
HENRY R. DAVIS,
TIMOTHY F. DWYER.